No. 834,518. PATENTED OCT. 30, 1906.
W. H. GRASSER.
INSECT TRAP.
APPLICATION FILED JAN. 24, 1906.
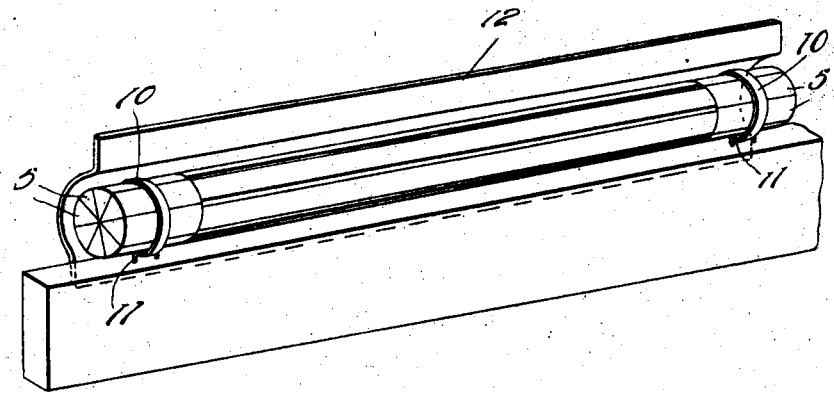
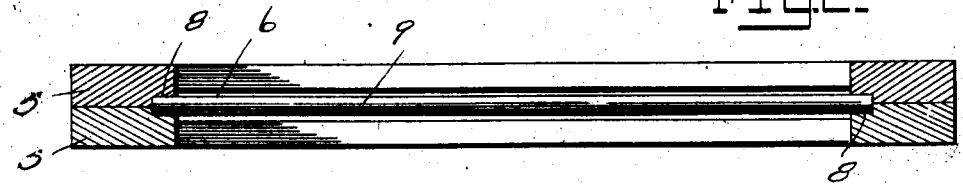
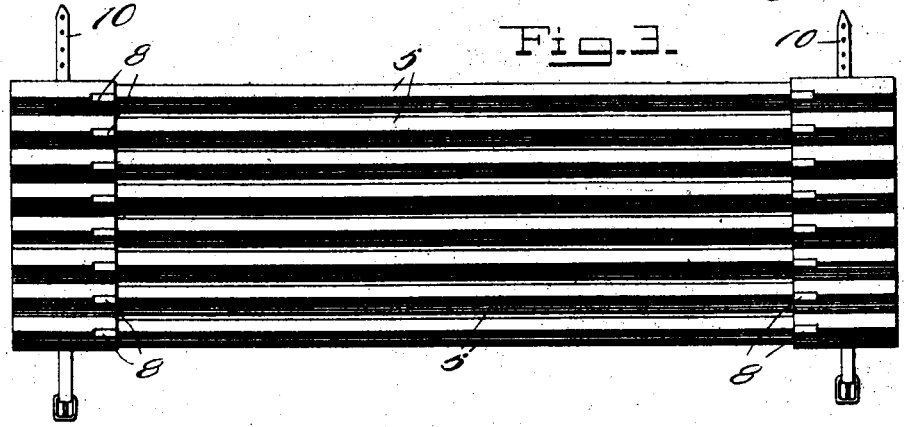
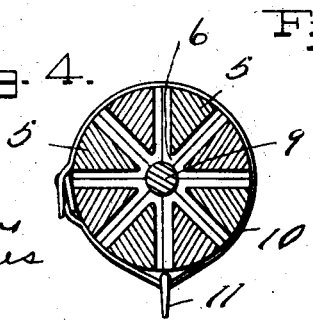
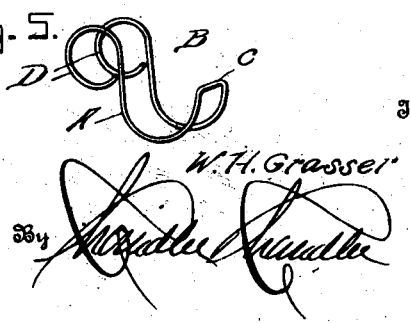

UNITED STATES PATENT OFFICE.

WILLIAM H. GRASSER, OF OROFINO, IDAHO.

INSECT-TRAP.

No. 834,518.    Specification of Letters Patent.    Patented Oct. 30, 1906.

Application filed January 24, 1906. Serial No. 297,636.

*To all whom it may concern:*

Be it known that I, WILLIAM H. GRASSER, a citizen of the United States, residing at Orofino, in the county of Nez Perce, State of Idaho, have invented certain new and useful Improvements in Insect-Traps; and I do hereby declare the following to be a full, clear, and exact description of the invention, such as will enable others skilled in the art to which it appertains to make and use the same.

This invention relates to traps, and more particularly to insect-traps, and has for its object to provide a trap especially designed to catch carniferous vermin, such as are found in beds and sleeping quarters, and has for its object to provide a device which will afford numerous crevices for the entrance of the insects, it being well known that insects of this particular kind habitually frequent small cracks in furniture, abrasions in wall-paper, &c.

Other objects and advantages will be apparent from the following description.

In the drawings forming a portion of this specification, and in which like characters of reference indicate similar parts in the several views, Figure 1 is a view showing a portion of a bed with the present invention attached thereto. Fig. 2 is a longitudinal section of the trap. Fig. 3 is a view showing the trap open. Fig. 4 is a transverse section through the body portion of the trap, one of the straps being in elevation. Fig. 5 is a detail perspective view showing a different device for fastening the trap to a bedstead.

Referring now to the drawings, the present invention comprises a cylindrical body portion including a plurality of longitudinal strips 5, which at their ends are transversely sector-shaped, so that the end portions lie in mutual engagement. The end portions of the strips are also enlarged transversely, so that the intermediate portions of the strips are held with their edge portions in spaced relation, and the inner portions of the strips are cut away to form a central chamber 6 within the body portion, the spaces between the central portions of the several strips 5 forming passages communicating with the central chamber and opening through the outer surface of the body portion.

In the inner surface of each end of the chamber 6 there is formed a central socket 8, a portion of each of these sockets being formed in the end portion of each strip, and a core 9 is engaged at its ends in these sockets and lies slightly spaced from the inner faces of the central portions of the strips, as shown.

Straps 10 are engaged with the body portion at the end thereof and are secured to the several strips, the straps being connected at their end to hold the strips in operative position, and when the straps are disconnected the several strips may be moved to lie beside each other, as shown in Fig. 3, to permit of cleaning the trap. The straps 10 may be passed through loops 11, carried by one side rail of a bed, and a metallic shield 12 is secured to the side rail and extends upwardly and outwardly of the trap to prevent insects from passing therefrom to a wall against which the bed is placed.

In Fig. 5 there is shown a different method of attaching a trap to a bedstead, in which a wire hook is employed, consisting of a wire bent to form spaced legs A and B and a connecting-bight C. The legs are each given a compound curve by bending, and at their free ends they are curled inwardly, as shown at D, to form clips for engagement over a bed-rail. When thus engaged, the connected ends of the legs A and B extend upwardly, and the outer curves of the legs form rests to receive the trap. It will be understood that a plurality of these hooks are used for each trap and that when the latter are engaged therein the several portions of the trap are held in operative position by the hooks, as shown.

What is claimed is—

1. A trap comprising a hollow body portion including a plurality of separable sections, said body portion having a plurality of slots therein communicating with the interior thereof, and a core removably disposed within the body portion.

2. A device of the class described comprising a body portion including a plurality of longitudinally - extending separable strips, said body portion having a plurality of longitudinal slots therein communicating with its interior and terminating short of its ends and having sockets in the inner faces of its ends, a portion of each of said sockets being formed in each of the strips, a core removably engaged at its ends in the sockets, and means for holding the several strips in operative position.

3. A trap comprising a hollow body portion having a plurality of slots therein communicating with its interior, and a core within the body portion in spaced relation to the walls thereof.

In testimony whereof I affix my signature in presence of two witnesses.

WILLIAM H. GRASSER.

Witnesses:
P. H. BLAKE,
J. W. BLAKE.